Nov. 2, 1965 C. F. HALM ETAL 3,215,779

DIGITAL DATA CONVERSION AND TRANSMISSION SYSTEM

Filed Feb. 24, 1961 6 Sheets-Sheet 1

Inventors.
Charles F. Halm.
Mindaugas E. Jazbutis.
James T. Kries.
By. Hofgren, Brady, Wegner.
Allen & Stellman.
Attorneys.

DIGITAL DATA CONVERSION AND TRANSMISSION SYSTEM

Filed Feb. 24, 1961 6 Sheets-Sheet 3

Nov. 2, 1965 C. F. HALM ETAL 3,215,779

DIGITAL DATA CONVERSION AND TRANSMISSION SYSTEM

Filed Feb. 24, 1961 6 Sheets-Sheet 4

DIGITAL DATA CONVERSION AND TRANSMISSION SYSTEM

Nov. 2, 1965 C. F. HALM ETAL 3,215,779

DIGITAL DATA CONVERSION AND TRANSMISSION SYSTEM

Filed Feb. 24, 1961 6 Sheets-Sheet 6

United States Patent Office 3,215,779
Patented Nov. 2, 1965

3,215,779

DIGITAL DATA CONVERSION AND TRANSMISSION SYSTEM

Charles F. Halm, Mindaugas E. Jazbutis, and James T. Kries, Chicago, Ill., assignors to The Hallicrafters Co., a corporation of Delaware Filed Feb. 24, 1961, Ser. No. 105,835
28 Claims. (Cl. 178—67)

This invention relates to a data transmission system and more particularly to a high speed digital data transmission system.

A troublesome limiting factor on the speed with which information may be transmitted from one point or apparatus to another is the bandwidth of the transmission medium, whether it be over a telephone line, by way of radio waves, or some other transmission medium. For example, the standard telephone line has a nominal bandwidth from 300 to 3000 cycles per second. In the transmission of binary digital data, it has been found there is practical limit to the speed or rate at which the data may be handled. With standard transmitting equipment and modulation schemes, it is generally necessary to limit the data rate to about two-thirds of the upper frequency of the bandwidth, or 2000 bits of data per second where the upper bandwidth limit is 3000 cycles per second.

This invention is concerned with a novel system and method for handling data in which the basic data rate may equal or even exceed the transmission medium bandwidth.

One feature of the invention is the provision of a transmitting system in which digital data in $m$-bit groups are translated to $n$-bit groups, with predetermined limitations on the sequence of digits in each $n$-bit group, and the $n$-bit groups modulate a carrier. More specifically, $m$ and $n$ are integers with $n$ being greater than $m$. A further feature is that in each of the $n$-bit groups, each one-bit of data is preceded and succeeded by one or more zero-bit.

Another feature is that the translated $n$-bit data groups are utilized to effect phase reversal modulation of a carrier, preferably in such a manner that phase reversals occur in the vicinity of the carrier base line. The carrier preferably has a frequency equal to one-half the rate of the $n$-bit data and may be about the upper limit of the bandwidth of the transmission indicia.

Yet a further feature of the invention is that a source of synchronizing signals is provided together with means responsive to the synchronizing signal to produce an $n$-bit synchronizing group having a predetermined sequence of digits which is excluded from the sequences of digits producible by the data translating means. Another feature is that the synchronizing signal comprises a sequence of a one-bit and $n$–1 zero-bits. And a further feature is that the $n$-bit data groups have a maximum of $n$–3 sequential zero-bits, providing a safety factor in the detection of the synchronizing signal.

Still another further feature is that the transmitting means include means for controlling the transfer of the data groups through the data translating means together with means responsive to the synchronizing signal for generating an $n$-bit synchronizing group and means responsive to the synchronizing signal for blocking the transfer of other data during the generation of the synchronizing group.

A further feature of the invention is the provision of a method of transmitting digital data information which comprises providing data in $m$-bit groups at a digit rate, $f_m$, translating said $m$-bit groups to $n$-bit groups at a digit rate, $f_n$, where $$\frac{m}{f_m}=\frac{n}{f_n}$$

providing a carrier signal, and phase shift modulating the carrier with the $n$-bit digital information. Still another feature is that the data transmitting method includes the provision of a carrier signal having a frequency $f_c$, equal to $f_n/2$, and phase reversal modulating the carrier with the $n$-bit data, effecting phase reversal at the base line of the carrier.

Yet a further feature is the provision of digital binary data receiving apparatus including a source of phase shift modulated carrier signal with modulation having each bit of a first character preceded and followed by a bit of a second character, phase shift means connected with said modulated carrier source for delaying the received signal, shifting it with respect to the undelayed signal by an amount corresponding to the modulation phase shift of the signal, and a comparison detector for comparing the undelayed signal with the delayed signal and having an output which indicates the occurrence of the data bits of said first character. And another feature is the provision in the receiving apparatus of means for eliminating from the output of the comparison detector one of each two successive information bits of said first character, should they occur.

Further features and advantages of the invention will readily be apparent from the following specification from the drawings in which.

The digital data handling system will be described herein as incorporated in a data transmission system, which might, for example, be used in transmitting data between two points remote from each other. The transmission medium interconnecting the transmitter and the receiver may comprise one or more conductors, or acoustic or electromagnetic waves coupled to a suitable medium, as air, space, ground, or water. The system will be described primarily on terms of the transmitting and receiving apparatus which form the connecting links to the transmission medium. It will be understood that the transmitter may receive encoded data to be transmitted from any suitable source as a sensing instrument, computer, data-processing machine, or the like, while the data output from the receiver may likewise be used in any of a variety of manners, as an input to a computing or other data-processing machine, to a recorder, to control further apparatus, or the like. The system may operate between two fixed points, between a fixed point and a vehicle, or between two vehicles. The data handled may represent various types of information, as teletype, facsimile, television, telemetry, music, or the like.

During the course of the description of the invention, reference will be made primarily to block diagrams of the transmitting and receiving apparatus. The various block units which are utilized are primarily standard electronic units and sufficient description of them will be given to enable one skilled in the art to understand the nature and functioning of the apparatus. In several instances, in order to aid in an appreciation of the operation of the system, specific schematic circuits are disclosed for certain of the block components. It is to be understood that these specific schematic circuits are intended solely as illustrative of the type of circuits usable in the system and many changes and modifications will readily be apparent.

Figure 1:
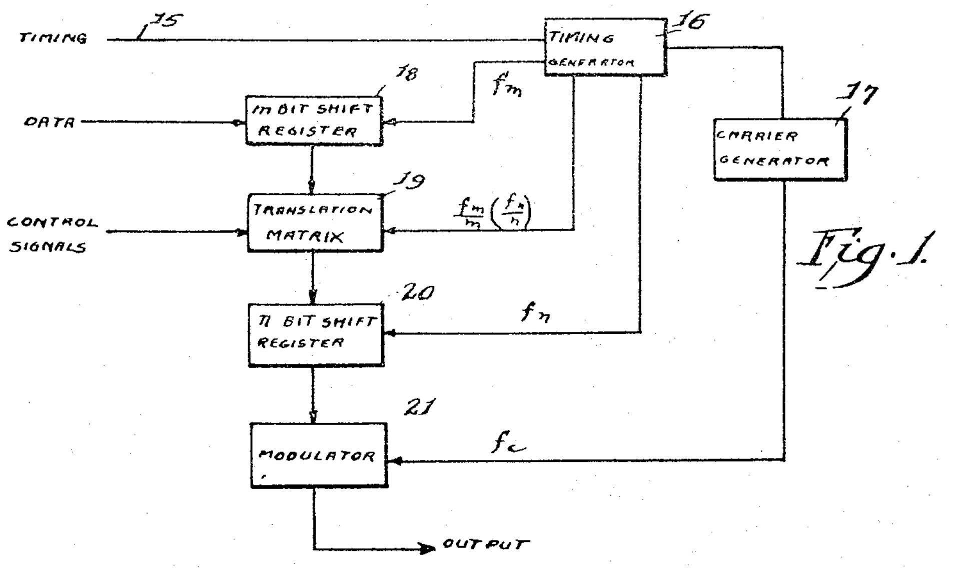
FIGURE 1 is a basic block diagram of a transmitter embodying the invention.

Referring first to FIGURE 1, the transmitting apparatus is shown in simplified block form. A timing signal from a suitable source( not shown) is connected by lead 15 to a timing generator 16 which provides certain timing signals, and synchronizes the operation of a carrier generator 17. Data from a suitable source (not shown) is supplied in binary digital form to the transmitter. The data bits are encoded or arranged in groups of $m$-bits and are applied to the transmitter at a rate designated, $f_m$, the number of bits per second. The $m$-bit data groups are coupled serially to an $m$-bit shift register 18 which is supplied with a timing signal at a frequency $f_m$, from timing generator 16. The $m$-bit code groups are periodically transferred from the $m$-bit shift register 18 through a translation matrix 19, where the $m$-bit groups are converted to $n$-bit groups, to a $n$-bit shift register 20. The rate of translation of data groups through the translation matrix 19 depends on the rate at which $m$-bit groups of data are received in the $m$-bit shift register, and may be expressed as $f_m/m$ or $f_n/n$, which is equal thereto. The translated data are serially removed from $n$-bit shift register 20, under the control of a timing pulse having a frequency $f_n$, and coupled to a modulator 21 to which the carrier $f_c$ is also coupled. The output of modulator 21 may be suitably filtered, amplified and coupled to the transmission medium.

The translation matrix 19 comprises logical circuits which are designed to effect the translation of the data from $m$-bit groups to $n$-bit groups, $m$ and $n$ being integers and $n$ greater than $m$ with certain predetermined restrictions on the location and sequence of digits in the $n$-bit groups. Specifically, with $n$ greater than $m$, more code groups are available in the $n$-digit groups than in the original $m$-digit groups. The translation is so effected that there are no two consecutive one-bits of information in the $n$-bit code groups. In the modulator 21, the $n$-data bits effect phase reversal modulation of the carrier which is preferably timed such that phase reversals take place at or in the vicinity of the carrier base line upon the occurrence of each one-bit of information. As there are no consecutive one-bits of $n$-digit information, there is at least a full cycle of carrier between each phase reversal. The modulated signal may be filtered to remove higher order modulation products not necessary for recovery of the intelligence. The data restriction and modulating method permit the use of a data frequency $f_n$, twice the carrier frequency, $f_c$, without requiring the transmission of higher order modulation products which could not be handled within the bandwith limitations of many transmission mediums.

Control signals, as a word synchronizing signal and control signals for other functions, may be coupled to the transmitter and operate in the matrix 19 to produce unique code groups in the $n$-bit shift register. The word synchronizing signal is of particular importance in a data transmission system and with the apparatus disclosed herein, utilizing translation of data from groups of $m$-bits to groups of $n$-bits may be selected to have a unique code group all its own, which cannot appear as a result of incoming $m$-bit data. This increases the reliability of the operation of the system.

Figure 2:
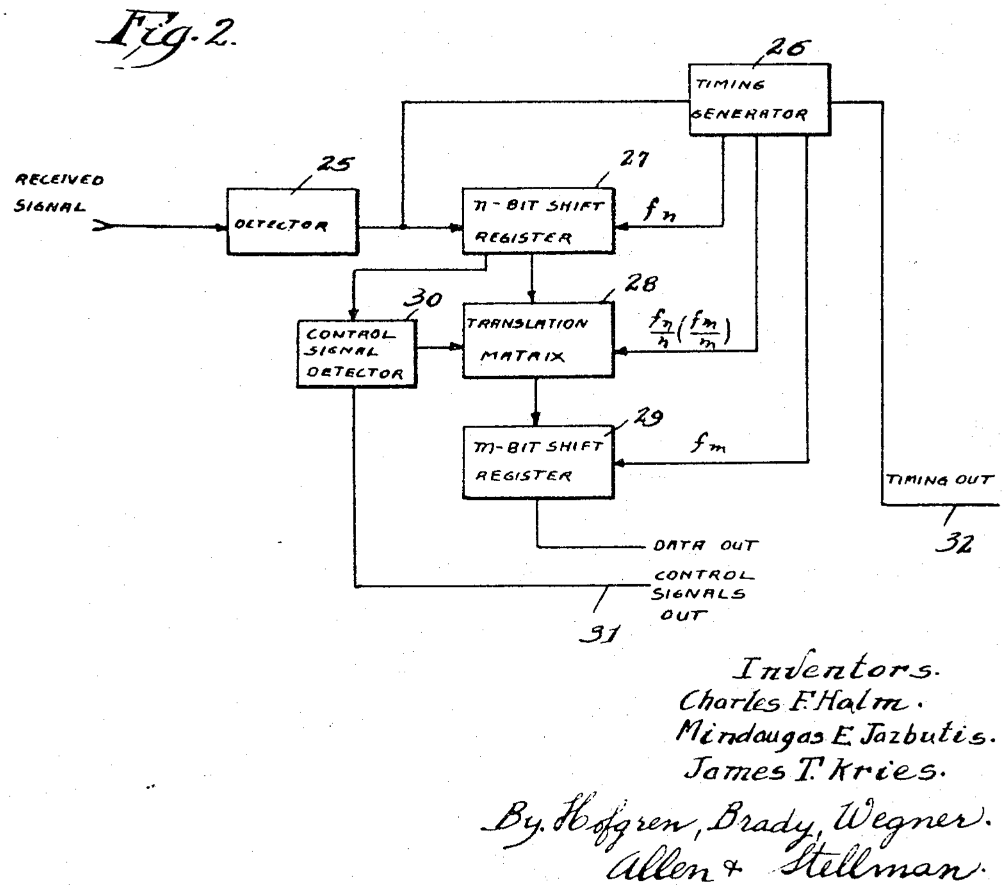
FIGURE 2 is a basic block diagram of a receiver embodying the invention.

In the receiver of FIGURE 2, the received signal is coupled to a detector 25 from which is derived digital information in $n$-bit groups. A signal from the detector is utilized to control or synchronize the operation of a timing generator 26, which produces the various timing signals required in the apparatus. The data groups are fed serially to an $n$-bit shift register timed by a signal from generator 26 at a frequency $f_n$. The $n$-bit data groups are periodically transferred to translation matrix 28 from which the original $m$-bit data groups are derived and coupled to $m$-bit shift register 29. The rate of group transfer through translation matrix 28 may be expressed as $f_n/n$ or $f_m/m$. The data is removed serially from $m$-bit shift register 29 under the control of timing signal $f_m$ from generator 26. The control signals, which as pointed out above may be unique in character, are derived directly from the output of $n$-bit shift register 27, by a detector circuit 30 and coupled to an output circuit as 31. Upon detection of a control signal, transfer of ditigal information through matrix 28 may be stopped to prevent the appearance of the control signal in the data output. A timing signal for use in the further data-handling apparatus may also be derived from timing generator 26 at terminal 32.

Figure 3:
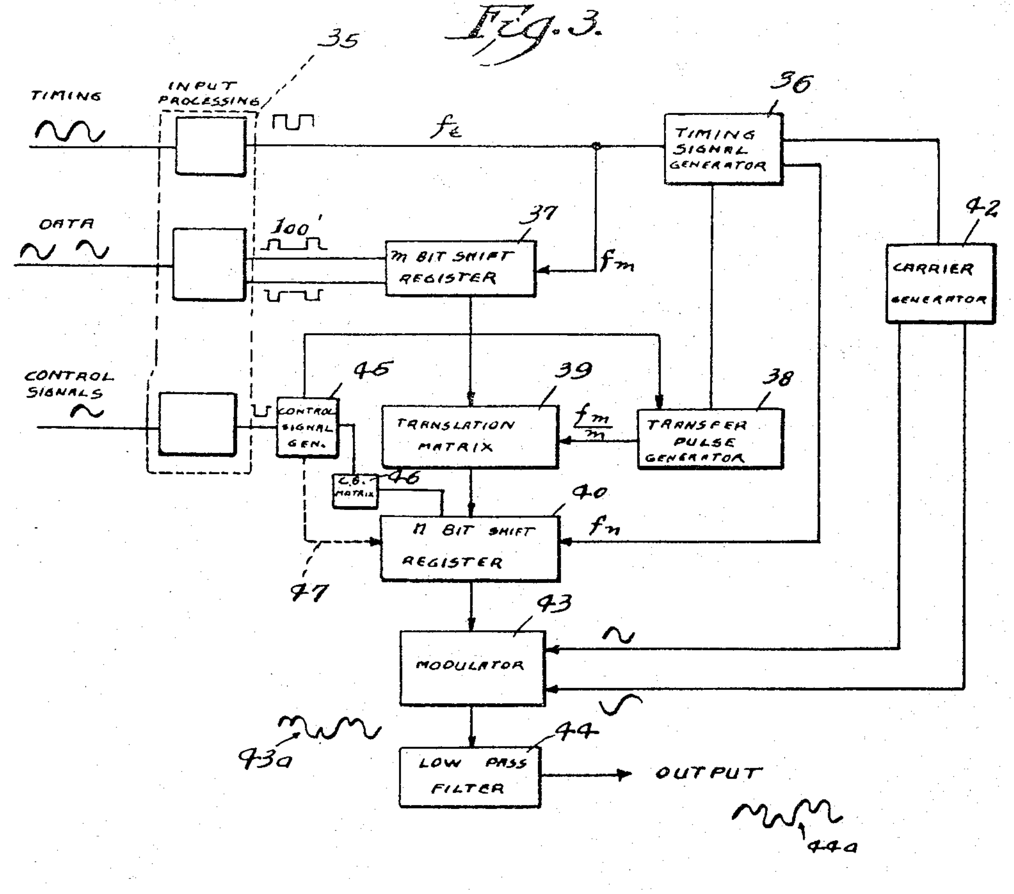
FIGURE 3 is a further block diagram of a transmitter embodying the invention.

Turning now to FIGURE 3, a more detailed embodiment of the transmitting apparatus will be described. The inputs to the transmitter, i.e, a timing signal, data and control signals, may be in the form of sine waves, with the timing signal a continuous sine wave, the data a series of sine wave dipulses (one dipulse in one full cycle) with the presence of a dipulse indicating a one-bit and the absence thereof a zero-bit in a digital data train, and the control signals comprising one or more sine wave dipulses. The frequencies of the signals are preferably the same. Each of the incoming signals is coupled through an input processing stage in which the sine wave is clipped and sliced and otherwise shaped to provide a series of generally square waves. The square wave timing pulse, $f_t$ (which is identical in frequency with the digital data rate $f_m$) is coupled to timing signal generator 36. The input processing circuit for the data channel has complementary outputs 180° out of phase, one comprising positive going pulses representing one-bits and the other positive going pulses representing zero-bits of the incoming data. The $m$-bit code groups of data are serially received in $m$-bit input shift register 37, the operation of which is timed by signal $f_m$ derived from the timing channel of the transmitter.

A transfer pulse generator 38 receives a signal from timing signal generator 36 and provides a transfer pulse at a frequency $f_m/m$ that is utilized to control the transfer of data groups from $m$-bit shift register to translation matrix 39 and from the matrix to $n$-bit output shift register 40. An entire code group or block is transferred simultaneously.

Carrier generator 42 operates under the control of timing signal generator 36 and has two carrier signal outputs, one being 180° out of phase with the other. In the modulator 43, the $n$-bit digital information is serially introduced under the control of a timing signal $f_n$ from $n$-bit shift register 40. The occurrence of a one-bit digit at the modulation effects a reversal of the carried wave phase so that the modulator output signal has the general appearance illustrated at 43$a$. It will be noted that the phase reversals of the carrier occurs generally at the carrier signal base line and are separated by at least one full cycle of carrier wave. At the modulator, the signal reversals are rather sharp. This signal is passed through a low pass filter 44, which has an idealized output of the nature illustrated at 44$a$. The signal 44$a$ may be suitably amplified and transmitted.

Control signals are coupled from the control input processing stage to control signal generator 45 which generates a suitable signal for effecting the ultimate generation of the desired $n$-bit control signal code in a control signal matrix 46. During the generation of a control signal, it is necessary to prevent the transmission of data from $m$-bit shift register 37 to translation matrix 39. Accordingly, a connection between control signal generator 45 and transfer pulse generator 38 prevents or inhibits the generation of a data transfer pulse during the generation of a control signal. Under certain circumstances, as will appear below, a control signal may be generated directly in $n$-bit output shift register, and in this situation a connection 47 is provided directly from control signal generator 45 to $n$-bit shift register 40.

The control signals may be initiated manually as by operation of a switch at the transmitter, or automatically in some desired manner. For example, the data source, as a computer, may originate a control signal indicating a particular end use for the data at the receiver; or a word synchronizing signal may automatically be originated periodically to insure proper grouping of the data bits at the receiver.

Figure 4:
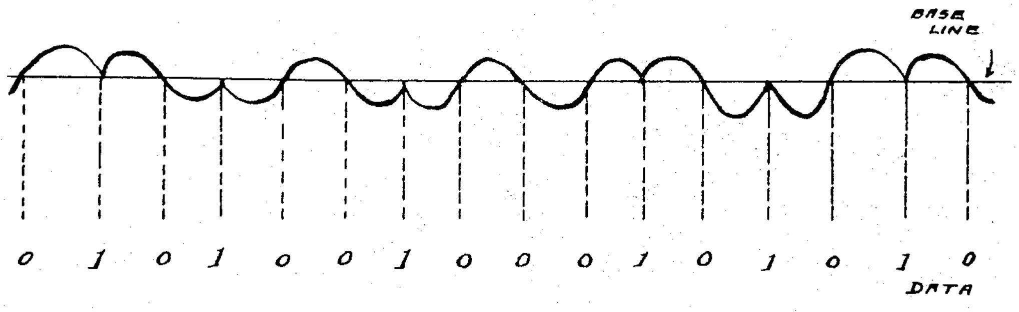
FIGURE 4 is a curve illustrating the nature of the modulated carrier at the output of the modulator.

The nature of the modulated carrier wave and its relation to the translated $n$-bit digital data information is shown in an idealized form in FIGURE 4. Assuming that the encoded information is traveling to the right, the first digit in the sequence is zero and is indicated by the absence of a reversal of the carrier phase. One-half cycle of the carrier later a one-bit digit effects a phase reversal of the carrier and is followed by a zero-bit, thus giving a full cycle of the carrier. A further one-bit effects another phase reversal and is followed by a zero-bit giving another full carrier cycle. Following the next one-digit and its phase reversal, there are three consecutive zero-bits of information and two cycles of carrier without phase shift. The modulated carrier has no sharp discontinuities at high signal amplitude, with the only phase reversals occurring substantially at or in the vicinity of the base line and separated by at least one full cycle of carrier.

Generally speaking, the value of $n$ in the described system is greater than $m$ with the ratio $$\frac{f_m}{m}=\frac{f_n}{n}$$

where $f_m$ and $f_n$ represent the repetition rate or frequency of the data bits in the $m$- and $n$-bits data trains, respectively, to permit a continuous flow of data through the system. The carrier frequency $f_c$ is one-half the $n$-bit data rate $f_n$ and may be less than the $m$-bit data rate $f_m$ and equal to or even lower than the upper limit of the transmission medium bandwidth.

In a specific system having incoming data in 5-bit groups at a rate of 3000 bits per second, the translated code groups may have 9-bits at a rate of 5400 bits per second. A carrier frequency of 2700 cycles per second is used and the resulting modulated wave has no significant frequencies in its lower side band higher in frequency than 2700 cycles. The output of the modulator may be filtered to remove the upper side band and the modulated signal transmitted over a standard telephone line, which has a bandwidth of from 300 to 3000 cycles per second, without loss of data.

In this system, the translation from 5-bit to 9-bit code groups may be effected with the aforementioned limitation that there are no two one-bits of data in sequence, and the word synchronizing signal may be given a distinct code group, for example, characterized by a single one-bit followed or preceded by eight zero-bits. Furthermore, an additional safety factor for the reliable detection of the word synchronizing signal may be provided by eliminating from use any code group having $n$–2 or seven consecutive zero-bits. Even with these limitations on the translation of the information from 5- to 9-digit groups, there are still four more code groups available for transmission than necessary to handle the possible 5-bit incoming data groups. These extra groups permit the transmission of auxiliary control signals.

The design of the data translation matrix may be derived from the logical translation equations for the system. In these equations, the 5-bit incoming data group digits are represented by $d_1$ through $d_5$, while the nine group digits are indicated by $P_1$ through $P_9$. A set of translation equations, incorporation the limitations described above for a unique word synchronizing signal, an absence of consecutive one-bits in the translated information and a safety factor for the word synchronizing signal (such that there is no data group nor combination thereof which will produce $n$–2 consecutive zero bits) are as follows:

$P_1=d_1'+\text{SYNC}$ $P_2=d_1d_2+d_1d_3d_4d_5+\text{CONTROL NO. 1}$ $P_3=d_1d_2'd_4'+d_1d_2'd_5'+d_1'd_2'd_4+d_1'd_4d_5'$ $P_4=d_1d_2d_3d_4+d_1d_3'd_4d_5+d_1'd_2d_5+\text{CONTROL NO. 1}+\text{CONTROL NO. 2}+\text{CONTROL NO. 3}+\text{CONTROL NO. 4}$ $P_5=d_1d_2'd_3d_4+d_1d_3'd_4d_5'+d_1'd_2d_5'$ $P_6=d_1d_2d_5+d_1d_4'd_5+d_3d_4'd_5+d_1'd_2'd_5+d_1'd_3'd_4d_5+\text{CONTROL 2}+\text{CONTROL NO. 4}$ $P_7=d_3'd_5'+d_1d_2'd_3'd_4+d_1'd_2d_3'd_4'+\text{CONTROL NO. 1}$ $P_8=d_3+\text{CONTROL NO. 2}+\text{CONTROL NO. 3}$ $P_9=0$ The equations given above provide a high degree of reliability in the system. Simplification can be made eliminating certain redundancy at the expense of a certain degree of reliability.

The respective 5- and 9-bit data groups, including the synchronizing and other control signals are tabulated below:

| $d_1$ | $d_2$ | $d_3$ | $d_4$ | $d_5$ | $P_1$ | $P_2$ | $P_3$ | $P_4$ | $P_5$ | $P_6$ | $P_7$ | $P_8$ | $P_9$ |
|---|---|---|---|---|---|---|---|---|---|---|---|---|---|
| 0 | 0 | 0 | 0 | 0 | 1 | 0 | 0 | 0 | 0 | 0 | 1 | 0 | 0 |
| 0 | 0 | 0 | 0 | 1 | 1 | 0 | 0 | 0 | 0 | 1 | 0 | 0 | 0 |
| 0 | 0 | 0 | 1 | 0 | 1 | 0 | 1 | 0 | 0 | 0 | 1 | 0 | 0 |
| 0 | 0 | 0 | 1 | 1 | 1 | 0 | 1 | 0 | 0 | 1 | 0 | 0 | 0 |
| 0 | 0 | 1 | 0 | 0 | 1 | 0 | 0 | 0 | 0 | 0 | 0 | 1 | 0 |
| 0 | 0 | 1 | 0 | 1 | 1 | 0 | 0 | 0 | 0 | 1 | 0 | 1 | 0 |
| 0 | 0 | 1 | 1 | 0 | 1 | 0 | 1 | 0 | 0 | 0 | 0 | 1 | 0 |
| 0 | 0 | 1 | 1 | 1 | 1 | 0 | 1 | 0 | 0 | 1 | 0 | 1 | 0 |
| 0 | 1 | 0 | 0 | 0 | 1 | 0 | 0 | 0 | 1 | 0 | 1 | 0 | 0 |
| 0 | 1 | 0 | 0 | 1 | 1 | 0 | 0 | 1 | 0 | 0 | 1 | 0 | 0 |
| 0 | 1 | 0 | 1 | 0 | 1 | 0 | 1 | 0 | 1 | 0 | 1 | 0 | 0 |
| 0 | 1 | 0 | 1 | 1 | 1 | 0 | 0 | 1 | 0 | 1 | 0 | 0 | 0 |
| 0 | 1 | 1 | 0 | 0 | 1 | 0 | 0 | 0 | 1 | 0 | 0 | 1 | 0 |
| 0 | 1 | 1 | 0 | 1 | 1 | 0 | 0 | 1 | 0 | 1 | 0 | 1 | 0 |
| 0 | 1 | 1 | 1 | 0 | 1 | 0 | 1 | 0 | 1 | 0 | 0 | 1 | 0 |
| 0 | 1 | 1 | 1 | 1 | 1 | 0 | 0 | 1 | 0 | 0 | 0 | 1 | 0 |
| 1 | 0 | 0 | 0 | 0 | 0 | 0 | 1 | 0 | 0 | 0 | 1 | 0 | 0 |
| 1 | 0 | 0 | 0 | 1 | 0 | 0 | 1 | 0 | 0 | 1 | 0 | 0 | 0 |
| 1 | 0 | 0 | 1 | 0 | 0 | 0 | 1 | 0 | 1 | 0 | 1 | 0 | 0 |
| 1 | 0 | 0 | 1 | 1 | 0 | 0 | 0 | 1 | 0 | 0 | 1 | 0 | 0 |
| 1 | 0 | 1 | 0 | 0 | 0 | 0 | 1 | 0 | 0 | 0 | 0 | 1 | 0 |
| 1 | 0 | 1 | 0 | 1 | 0 | 0 | 1 | 0 | 0 | 1 | 0 | 1 | 0 |
| 1 | 0 | 1 | 1 | 0 | 0 | 0 | 1 | 0 | 1 | 0 | 0 | 1 | 0 |
| 1 | 0 | 1 | 1 | 1 | 0 | 1 | 0 | 0 | 1 | 0 | 0 | 1 | 0 |
| 1 | 1 | 0 | 0 | 0 | 0 | 1 | 0 | 0 | 0 | 0 | 1 | 0 | 0 |
| 1 | 1 | 0 | 0 | 1 | 0 | 1 | 0 | 0 | 0 | 1 | 0 | 0 | 0 |
| 1 | 1 | 0 | 1 | 0 | 0 | 1 | 0 | 0 | 1 | 0 | 1 | 0 | 0 |
| 1 | 1 | 0 | 1 | 1 | 0 | 1 | 0 | 1 | 0 | 1 | 0 | 0 | 0 |
| 1 | 1 | 1 | 0 | 0 | 0 | 1 | 0 | 0 | 0 | 0 | 0 | 1 | 0 |
| 1 | 1 | 1 | 0 | 1 | 0 | 1 | 0 | 0 | 0 | 1 | 0 | 1 | 0 |
| 1 | 1 | 1 | 1 | 0 | 0 | 1 | 0 | 1 | 0 | 0 | 0 | 1 | 0 |
| 1 | 1 | 1 | 1 | 1 | 0 | 1 | 0 | 1 | 0 | 1 | 0 | 1 | 0 |
| Synchronization | | | | | 1 | 0 | 0 | 0 | 0 | 0 | 0 | 0 | 0 |
| Control No. 1 | | | | | 0 | 1 | 0 | 1 | 0 | 0 | 1 | 0 | 0 |
| Control No. 2 | | | | | 0 | 0 | 0 | 1 | 0 | 1 | 0 | 1 | 0 |
| Control No. 3 | | | | | 0 | 0 | 0 | 1 | 0 | 0 | 0 | 1 | 0 |
| Control No. 4 | | | | | 0 | 0 | 0 | 1 | 0 | 1 | 0 | 0 | 0 |

The code groups, of course, appear in reverse order in the modulated data train, the highest numbered digit occurring first in point of time. It will be noted that the digit $P_9$ is zero throughout the code groups. This permits the use of either a one- or zero-bit for the $P_1$ digit without danger of introducing consecutive one-bits by a particular sequence of data groups. Obviously, either terminal digit can be made zero and accomplish this result.

Figure 5:
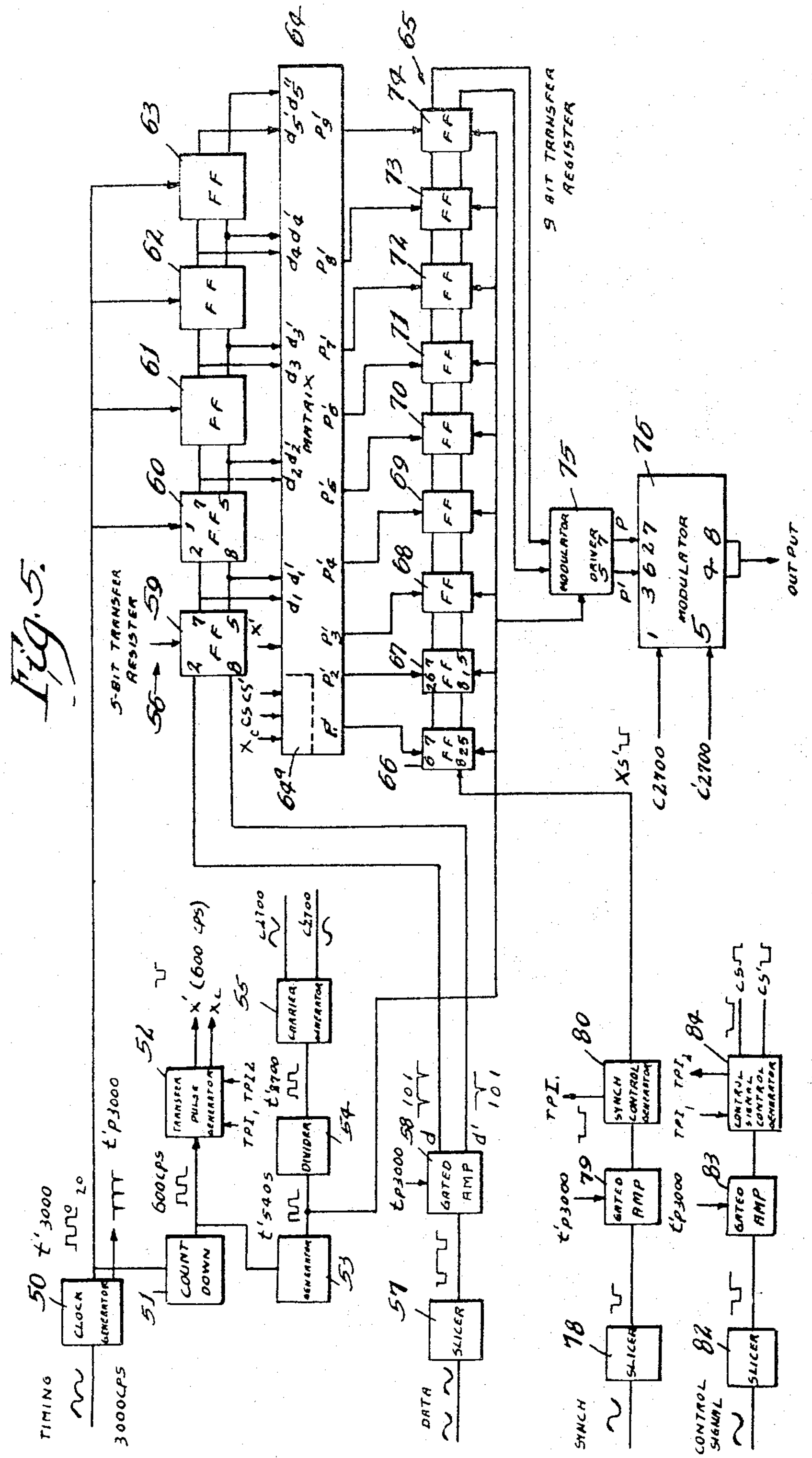
FIGURE 5 is a detailed block diagram of a transmitter embodying the invention.

A more detailed embodiment of the transmitter apparatus, illustrated in FIGURE 5, will now be described. Throughout this description, the specific frequencies of the foregoing illustration will be utilized to simplify an understanding of the operation. It will be understood that these frequencies represent only one specific embodiment of the system and that many other combinations are possible, as determined by the original data rate, bandwidth limitations and the like.

The timing signal, a 3000-cycle sine wave, is coupled to a clock generator 50 from which a 3000-cycle square wave output *t*'3000 is derived. A countdown circuit 51 connected with the clock generator 50 has a 600 c.p.s. rectangular wave output coupled to the transfer pulse generator 52, providing the data group transfer pulses X'. The timing circuit also includes the generator 53 having a square wave output *t*'5400 which is coupled through a divider 54 to a carrier generator 55 having two outputs C2700 and C'2700, both sine waves and with 180° phase displacement. A phase shift adjustment in generator 53 provides for phase control of the transmitter timing. Clock generator 50 also has a negative pulse output, comprising the differentiated edges of square wave *t*'3000 and designated *t*'*p*3000.

The data signal, which comprises 5-bit digital binary data groups with "ones" indicated by the presence of a 3000-cycle dipulse and "zeros" indicated by an absence thereof is coupled through a slicer circuit, where it is converted essentially to square wave pulses, to a gated amplifier 58, gater by the pulse signals *t*'*p*3000 so that only desired signals having the proper time relations are established. Furthermore, extraneous signals, as noise, occurring at times other than the occurrence of pulses *t*'*p*3000 are eliminated. The output of gated amplifier 58 includes the complementary 5-bit digital data pulses *d* and *d'*. For example, when a one-bit of information occurs, there will be a corresponding negative pulse *d*. With a zero-bit of information, there will be no *d* signal but a negative pulse *d'*. (The circuitry of the system disclosed herein employs trailing edge logic utilizing the positive going edges of the negative pulses.)

The 5-bit digital information is serially coupled to the 5-bit transfer register 56 which comprises five cascade-connected flip-flop circuits 59, 60, 61, 62 and 63. The digital signals are coupled along the cascade chain of flip-flop circuits under the control of timing pulses *t*'3000 so that the data signals are continuously moving into the register. Outputs taken from each of the stages represent the various digits of the 5-bit code groups.

The transfer pulse signal X' coupled to matrix 64 effects periodic transfer of these data pulses $d_1$, $d_1'$–$d_5$, $d_5'$ to the matrix. As the transfer pulse is derived from the basic timing signal, the transfer is effected in proper synchronism with the occurrence of discrete code groups in 5-bit input register. More specifically, this transfer occurs during the last half of each fifth bit.

The 9-bit data signals $P_1'$ through $P_9'$ derived from matrix 64, are coupled to the 9-bit output transfer register 65 which comprises nine cascade-connected flip-flop circuits 66 through 74. The translated data bits are moved serially out of the 9-bit data by means of a timing signal *t*'5400, and are coupled to a modulator driver 75 which has an output representing both the P and P' functions, connected to the phase reversal modulator 76. The carrier signal input to the modulator comprises both C2700 and C'2700, derived from carrier generator 55. In the modulator, the proper phase of the carrier signal is selected and coupled to the output as determined by the modulating data. The timing signals for the 9-bit output transfer register 65 and the modulator driver are derived from the same source as the carrier signal.

The word synchronizing signal is coupled into the transmitter through a slicer circuit 78 and a gated amplifier 79 controlled by gate pulse *t*'*p*3000 to synchronizing signal control generator 80. Control generator 80 has a first output $TPI_1$, a transfer pulse inhibiting signal which is connected to the trasfer pulse generator 52 to stop the generation of transfer pulse X'. This inhibiting pulse has a width sufficient to prevent the transfer of data during the period necessary to generate the word synchronizing signal. A second output pulse XS' from generator 80 controls the word synchronizing data group generation.

In the specific system described above, the word synchronizing signal comprises a one-bit followed by eight zero-bits. While this signal could be generated by the proper combination of matrix circuitry, it may easily be established by applying a single pulse to the first flip-flop circuit 66 in the 9-bit output data register 65. This single pulse travels through the 9-bit register under the control of timing signal *t*'5400 and, as the transfer of data through matrix 65 is prevented during the generation of the pulse, the one-bit will be followed by a series of zero-bits. The transfer inhibiting pulse $TPI_1$ extends for a sufficient period to permit the completion of the word synchronizing code group.

Further auxiliary control signals are similarly handled in the system. Only a single circuit is shown, although it will be understood that there will be a separate input circuit for each discrete control signal. The number of possible control signals depends on the nature of the translation used. The sine wave control signal input is connected through a slicer 82 to a gated amplifier 83, controlled by a strob pulse *t*'*p*3000 and to a control signal control generator 84. This control generator produces an inhibiting pulse $TPI_2$ which acts on transfer pulse generator 52 as did the word synch inhibiting pulse $TPI_1$ to prevent transfer of data during the generation of a control signal. A second output from the control generator, comprising complementary signals CS and CS' is coupled to control signal matrix 64*a* in which they actuate the proper circuits to establish the desired control code sequence. A control signal transfer pulse $X_c$ from transfer pulse generator 52 effects generation of the control signal at the proper time, following the translation of a data group. It is undesirable to have both the word synchronizing signal and the further control signal operative at the same time in the system and accordingly the control signal control generator 84 is also rendered inactive by inhibiting signal $TPI_1$.

Specific circuitry for certain components of the transmitting apparatus will now be described in detail, as an aid to an understanding of the operation of the system.

Figure 6:
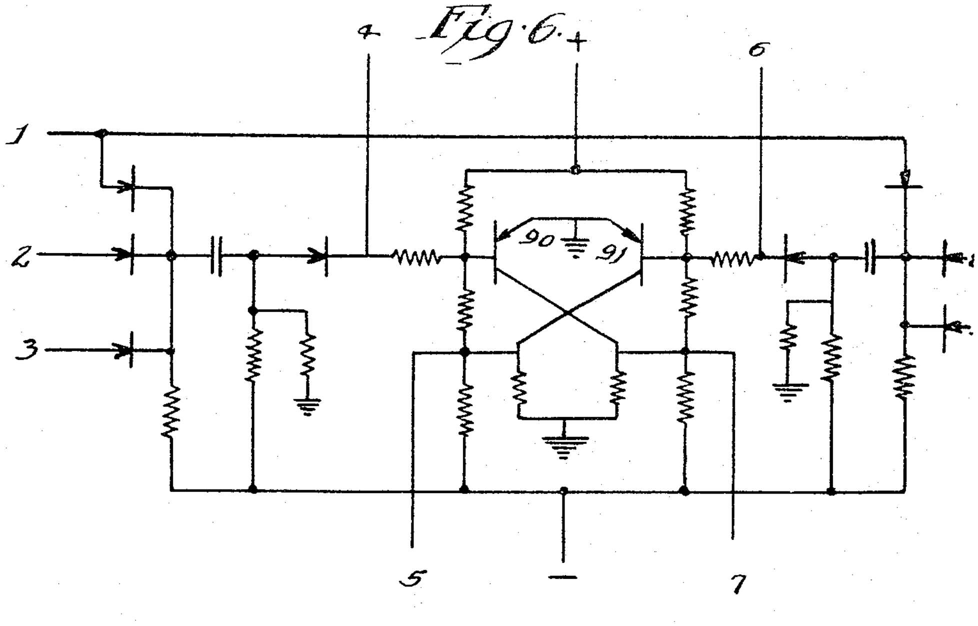
FIGURE 6 is a schematic circuit diagram of a flip-flop circuit utilized in the system.

In FIGURE 6, the schematic diagram of a basic flip-flop circuit, which is widely used in the apparatus, is shown. The circuit is basically that of a bistable multivibrator, utilizing a pair of transistors 90 and 91. Suitable biasing potentials are provided through resistive networks, as indicated. The terminal numbering utilized in FIGURE 6 corresponds with the terminal connections indicated numerically on certain of the flip-flop stages of the block diagrams, notably in FIGURE 5. The terminals 1, 2 and 3 provide a 3-input negative "and" gate so that the flip-flop circuit is actuated by suitable negative signals applied to these circuits. For example, assuming that transistor 90 is saturated and that transistor 91 is cut off by negative potentials applied to the inputs, a positively going signal applied to any one of terminals 1 through 3 causes a decrease of the collector current of transistor 90 and a corresponding increase in current through transistor 91 initiating the cross-coupled operation in reversing the condition of the circuit. This produces a negatively going pulse at output terminal 7 and a positively going pulse at output terminal 5 of the flip-flop circuit. With the conducting condition of the transistors reversed, the application of an appropriate control signal to any one of terminals 1, 8 or 9 will again reverse the circuit conditions. In each case, the applied signal must have a positive going edge in order to be coupled through the blocking diodes of the "or" gate circuits to control the operation of the flip-flop circuit. Reset terminals 4 and 6, which are connected through resistors with the base of transistors 90 and 91, respectively, allows the application of a positive reset signal to override operation of the flip-flop circuit without disrupting normal gate functioning. The specific nature of the operation or function of the flip-flop circuits in the apparatus depends to a certain extent on the function which is to be performed. The significant terminal connections to the various flip-flop circuits are indicated in the block diagram, FIGURE 5, and may be correlated with the circuit of FIGURE 6. The operation in each instance will readily be apparent to those skilled in the art.

Figure 7:
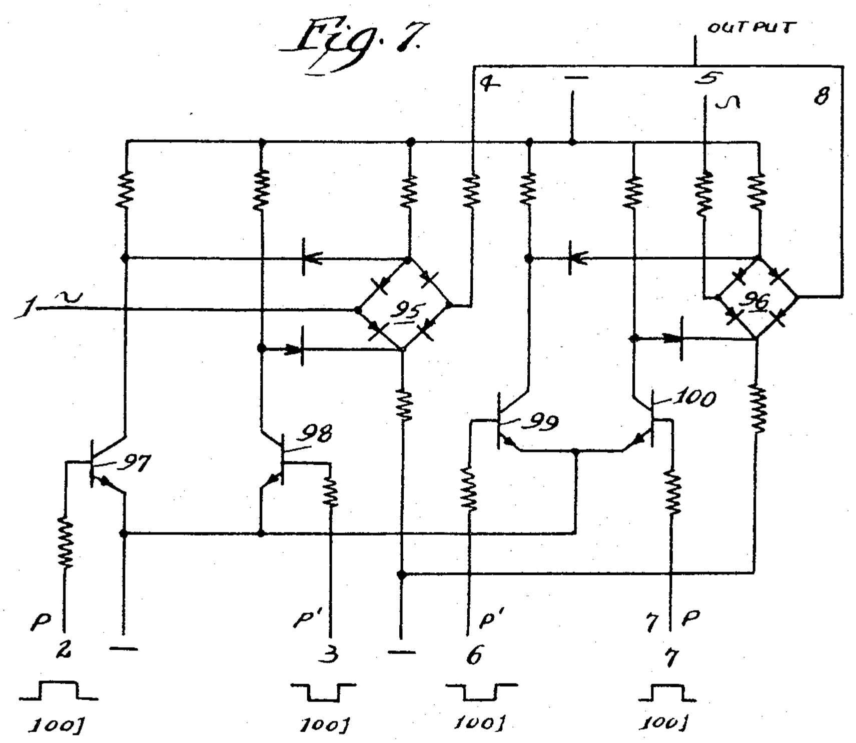
FIGURE 7 is a schematic diagram of a phase reversal modulator utilized in the invention.

In FIGURE 7, the schematic diagram for the phase reversal modulator is shown. Terminals 1 and 5 of the modulator are connected with the complementary outputs of the carrier generator, a carrier signal of one phase being applied to terminal 1 and a signal 180° out of phase therewith being applied to terminal 5. The translated digital information from the output register is coupled through the modulator driver 75 and complementary signals representing the *n*-bit data and designated as P and P' are coupled to the modulator. Representative wave forms indicating the digits 1 0 0 1 are shown in FIGURE 7.

The modulator circuit acts basically as a single pole-double throw switch alternately connecting the output (terminals 4 and 8 which are connected together) with one of the two sources of carrier (terminals 1 and 5). Diode networks 95 and 96 are connected between terminals 1 and 4 and terminals 5 and 8, respectively. When diode network 95 is conductive, the carrier signal connected with terminal 1 appears in the output while when diode network 96 is conductive, the carrier signal applied to terminal 5 appears in the output. The conduction of the diode networks 95 and 96 is in turn controlled by transistors 97, 98, 99 and 100. The transistors 97 and 98 associated with diode network 95 are responsive to the complementary P signals from the modulator driver as are the transistors 99 and 100. Transistors 97 and 100 are operated in synchronism as are transistors 98 and 99, the diode circuits 95 and 96 being alternately switched on and off.

The timing of the P and P' signals from the modulator driver 75 is under the control of a timing signal *t'*5400 (FIGURE 5) which is derived from timing signal generator 53, from which the carrier signals are also derived. Accordingly, the timing of the P pulses is properly correlated with the phase of the carrier signals to insure that the phase reversals of the carrier occur in the vicinity of the carrier base line. It will be recalled that the modulator output is filtered to remove high frequency components before transmission.

Figure 8:
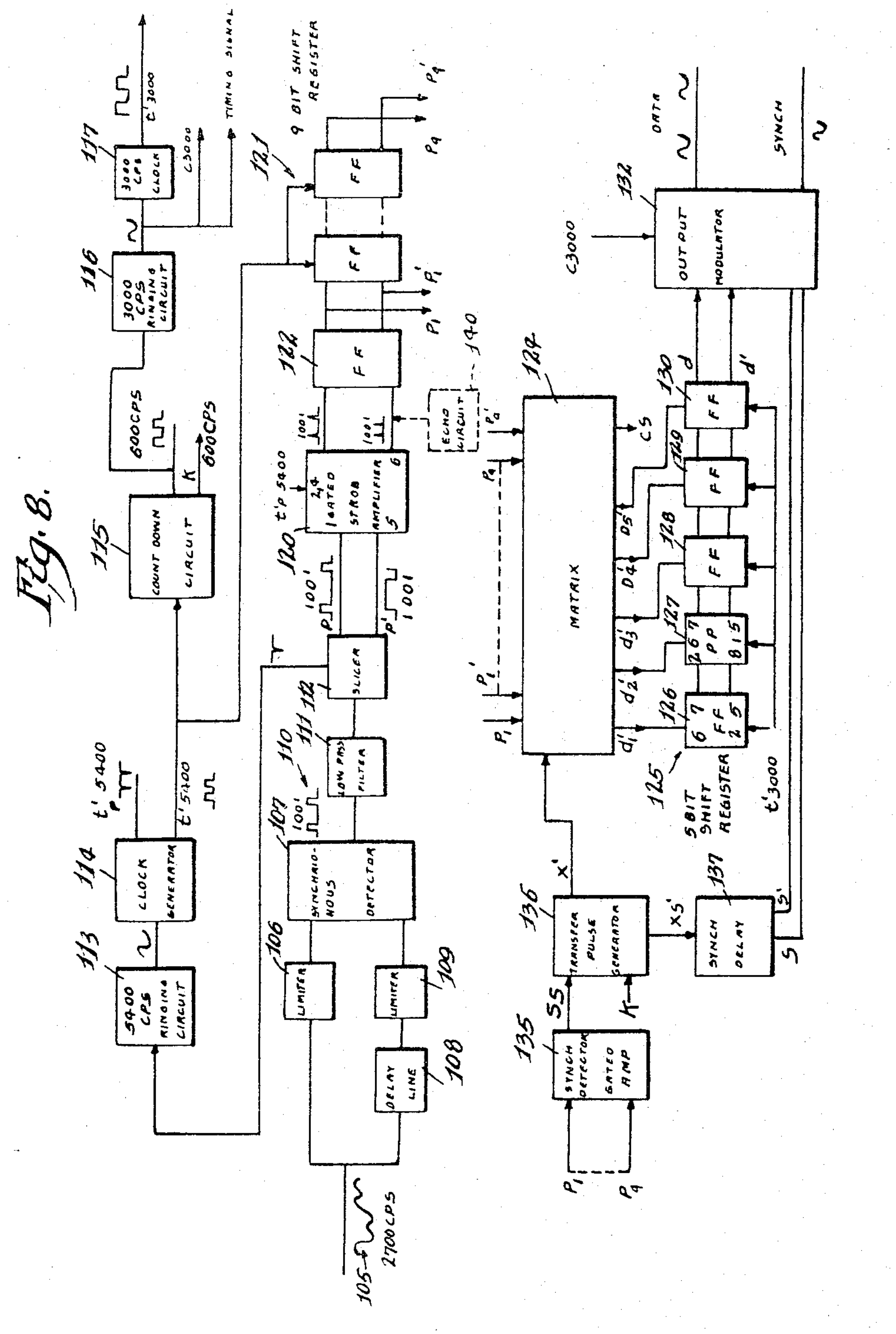
FIGURE 8 is a detailed block diagram of a receiver embodying the invention.

Referring now to FIGURE 8, a detailed block representation of the receiving apparatus is shown. The incoming signal, which may be derived from the telephone line, radio receiver or other transmission medium is illustrated in idealized form at 105 and corresponds generally with the signal developed in the transmitter. It will be appreciated, however, that the received signals may have amplitude variations and also carry extraneous noise pulses. In the receiver, a portion of the received signal is coupled through a limiter 106 which standardizes the amplitude and removes the effects of fading, to a synchronous detector 107. Another portion of the received signal is coupled through a delay line 108 and limiter 109 to detector 107. The delay line provides a time delay equal to the period of one information bit of transmitted signal, or 1/5400 second. In the synchronous detector, the undelayed information is compared with the delayed information to determine whether a difference exists, i.e. whether there was a phase reversal in the signal. If a phase reversal is detected, a one-bit signal is generated by the detector, while if there is no phase reversal detected, a zero-bit signal is generated. The output of the synchronous detector which may have generally the idealized form indicated at 110, is passed through a low pass filter which removes undesired high frequency transients, which are not illustrated in the representation of the signal. The output of low pass filter 111 is coupled to a slicer circuit 112 which quantizes the amplitude of the signal pulses.

From the slicer circuit 112, a differentiated pulse output signal is derived which is coupled to a 5400-cycle ringing circuit 113, providing a basis for the reconstitution of the timing signals in the receiver. As this timing circut is driven by a signal derived from received data, the timing is suitably synchronized with the received wave. The sine wave output of the ringing circuit 113 is connected to a clock generator 114 which provides two outputs, a square wave *t'*5400 and negative strob pulses *t'p*5400. The square wave signal *t'*5400 is coupled to a countdown circuit 115 from which is derived a 600-cycle transfer pulse K, and a 600-cycle rectangular wave which in turn drives a 3000-cycle ringing circuit 116. The sine wave output of ringing circuit 116 is used both in sine wave form and to drive a 3000-cycle clock having a square wave output *t'*3000. All of these timing signals are derived from and synchronized with the received signal.

Slicer 112 also provides complementary data outputs P and P', with the P signal having positive going pulses representing one-bits of information and the P' signal having positive going pulses representing zero-bits of information. These complementary signals are coupled to a gated strob amplifier 120 which is also supplied with the 5400-cycle pulse output *t'p*5400 of the clock generator 114. The purpose of the strob amplifier is to permit passage of a signal only when the P and P' information coincides with the narrow 5400-cycle strob pulses. This eliminates a great deal of noise inteference and, in conjunction with the limiter, permits reliable operation of the system with low level received signals. The circuit of the gated amplifier will be described more completely below.

The output of gated amplifier 120 comprises positive going P pulses corresponding with one-bits of information and positive going P' pulses corresponding with zero-bits of information. The P signals are fed to the 9-bit shift register 121 which comprises a series of nine cascade-connected flip-flop circuits through which the data passes serially under the control of a timing signal *t'*5400. The outputs of each of the flip-flop stages represent the digital information $P_1$ through $P_9$ and its complements $P_1'$ through $P_9'$. This information is coupled to the receiver 9-bit to 5-bit translation matrix 124 which opens under the control of a transfer pulse X', at a 600-cycle transfer rate and occurring during the last half of the ninth bit of each code group. This signal is derived from the 600-cycle output of countdown circuit 115, but is controlled by the word synchronizing signal as will appear. The output of translation matrix 124 is made up of the complementary d functions $d_1'$ through $d_5'$, which appeared in the original data information. This information is coupled to 5-bit output register 125 comprising a series of cascade-connected flip-flop circuits 126, 127, 128, 129 and 130, from which it is removed in serial form under the control of timing pulse *t'*3000. The output of the 5-bit shift register includes both the original *d* information and the complementary *d'* information.

In the embodiment of the invention illustrated, these data signals are coupled to an output modulator 132 which is also supplied with a 3000-cycle sine wave C3000 from the ringing circuit 116, and the output data from the receiver appears in its original dipulse form. Obviously, the *d* information might be used directly from an output of shift register without reconversion to a sine wave, if this were the desired output form.

The word synchronizing signal detector circuit, as a 9-input gated amplifier, has the appropriate outputs of the 9-bit shift register connected to it and upon the occurrence of the word synchronizing signal at any point in the transmission, is actuated to produce a synchronizing signal SS which is coupled to the transfer pulse generator 136. The occurrence of a word synchronizing signal blocks the generation of a data transfer pulse X', temporarily blocking incoming data through matrix 124. A synchronizing signal XS' from transfer pulse generator 136 is coupled through a synchronizing signal delay circuit 137 to the output modulator 132. The synchronizing signal delay corresponds with the time required for data information to be shifted out of 5-bit shift register 125 and provides the synchronizing signal in the output of modulator 132 in proper time relation with earlier transmitted data signals. The synchronizing signal may be reconverted to a 3000-cycle dipulse or utilized in some other form, as desired.

Matrix 124 contains logical circuits which perform the reverse function from those in the transmitter matrix, the circuit of the receiver translating the 9-bit data information back to the original 5-bit form. The logical equations for the matrix 124 are given below:

$$\text{SYNCH}=P_1P_2'P_3'P_4'P_5'P_6'P_7'P_8'P_9'$$
$$d_1=P_1'$$
$$d_2=P_1P_4+P_1P_5+P_2P_5'+P_2P_7$$
$$d_3=P_8$$
$$d_4=P_1P_3+P_1P_3'P_4P_6P_8'+P_1P_3'P_4P_6'P_8+P_1'P_2'P_3P_5+P_1'P_2'P_4P_7+P_2P_4+P_2P_5$$
$$d_5=P_6+P_1P_3'P_4P_6'P_8+P_2P_4'P_5P_6'P_8+P_3'P_4P_5'P_6'P_7$$
$$\text{CONTROL NO. }1=P_2P_4P_7$$
$$\text{CONTROL NO. }2=P_1'P_2'P_4P_6P_8$$
$$\text{CONTROL NO. }3=P_1'P_2'P_4P_6'P_8$$
$$\text{CONTROL NO. }4=P_1'P_2'P_4P_6P_8'$$

Figure 9:
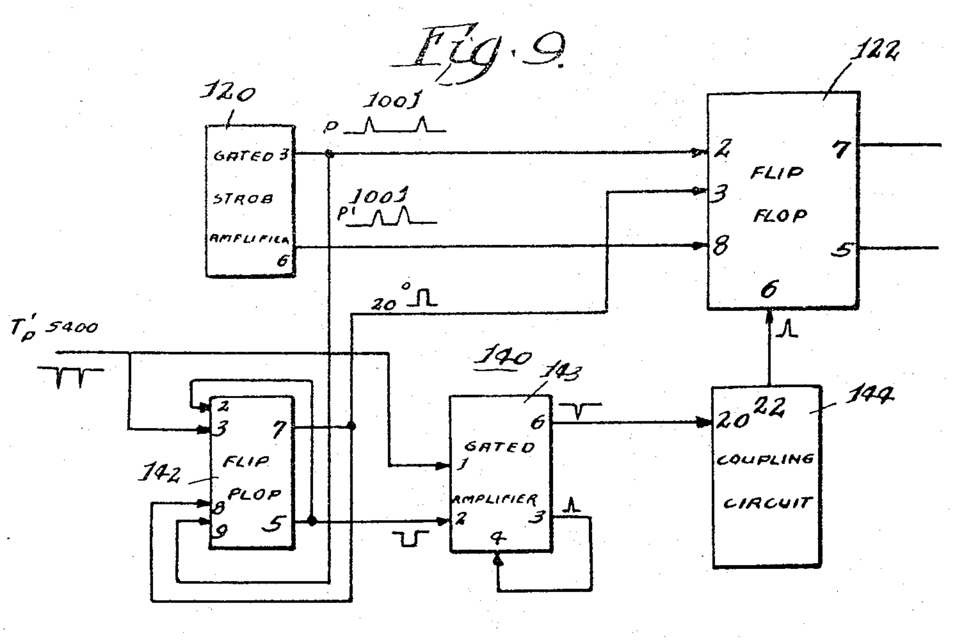
FIGURE 9 is a block diagram of an error eliminator which may be incorporated in the receiver.

It has been found that the most common error in the operation of the system with noise or low signal amplitude is the occurrence of a false one-bit or echo following a true one. The nature of the translated signal limitation by virtue of which there can be no two successive one-bits of information, permits the incorporation of a novel echo-elimination circuit 140 in the receiver. The nature of the output of the gated strob amplifier 120 has already been established. The P signal comprises a series of positive going pulses corresponding with one-bits of infomation while the complementary P' signal comprises a series of positive going pulses corresponding with zero-bits of information. This is again illustrated in FIGURE 9. The strob amplifier output signal is coupled to the input of the first flip-flop stage 122 of 9-bit shift register 121. With a correct signal applied to the flip-flop stage, i.e. one which has no spurious one-bit indications, a one-bit provides a positive pulse applied to terminal 2 and a corresponding positive pulse appears at output terminal 7. The next succeeding bit is a zero-bit of information having a positive pulse in the P' channel and applied to terminal 8 of flip-flop 122. This reverses the condition of the flip-flop circuit and generates a corresponding positive pulse at output terminal 5. If a spurious one-bit piece of information is present in the signal channel, a second positive pulse will follow the first in the P channel and the flip-flop circuit will be maintained in the one-bit indicating condition, with a positive output from terminal 7. This occurrence is pevented by the echo circuit 140 connected between strob amplifier 120 and the first flip-flop stage 122.

A positive one-bit signal from the P output of gated strob amplifier 120 is connected to terminal 9 of flip-flop 142. Reference to FIGURE 6 will show that this cuts off transistor 91 of the flip-flop circuit and generates a positive signal at terminal 7 and a negative signal at terminal 5. The positive signal from terminal 7, which is wide enough to last until the next data pulse, is coupled to terminal 3 of flip-flop 122, acting in parallel with the P information signal applied to terminal 2 and tending to maintain the condition of flip-flop 122 regardless of the next P signal. The negative signal from terminal 5 of flip-flop 142 is coupled through gated amplifier 143, where it is converted to a sharp pulse by the gating effect of pulse $t'p$5400 inverted and derived as a negative going pulse from terminal 6 (the operation of the gated amplifier will be described below). This negative pulse, which is delayed in time from the P information pulses, is connected through a coupling circuit 144 to terminal 6 of flip-flop 122 to which it is applied as a positive going signal. Reference again to FIGURE 6 will show that this positive going signal which is coupled to terminal 6 of flip-flop circuit 121 resets the flip-flop, to the zero-bit condition, corresponding to the action of a positive P' pulse if it had occurred where it properly should have been. Thus, the echo circuit 140 prevents the transmission of two successive one-bit information signals to the 9-bit shift register of the receiver. A 5400-cycle pulse signal $t'p$5400 is coupled to terminal 3 of flip-flop 142 to reset this flip-flop circuit in readiness for the next occurrence of one-bit information from gated strob amplifier 150. Cross coupled feedback connections between terminals 5 and 2, and 7 and 8 of flip-flop 142 improve its operation.

Figure 10:
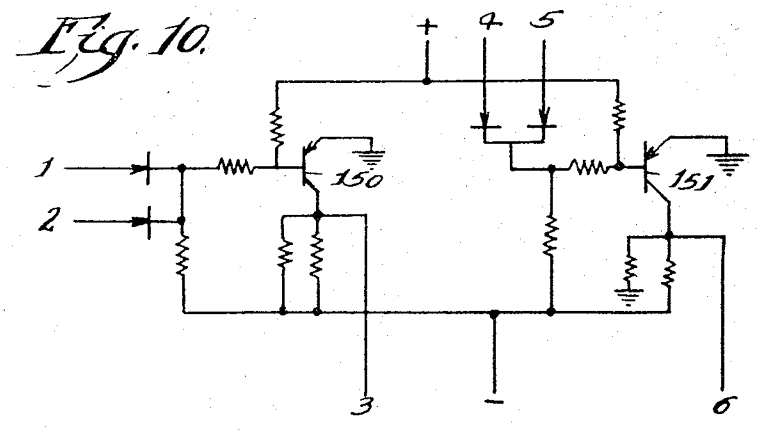
FIGURE 10 is a schematic circuit diagram of a gated amplifier utilized in the invention.

The schematic diagram of the gated amplifier used in the system (and which may be used for either gated strob amplifier 120 or the gated amplifier 143, for example) is given in FIGURE 10. The gated amplifier comprises two separate transistor amplifier stages 150 and 151. Each of the amplifier stages has a plurality of inputs connected for negative "no" pulse operation and the transistor serves as an inverting amplifier. Transistor 150 has the input terminals 1 and 2 connected therewith and the output terminal 3, while transistor 151 has input terminals 4 and 5 and an output terminal 6. The operation of both circuits is comparable, and only one will be described. With zero voltage input signals on one or more of the input terminals, transistor 150 does not conduct and output terminal 3 is substantially at −20 v. potential. When negative signals are simultaneously applied to terminals 1 and 2, the input diodes are rendered conductive and transistor 150 is saturated. This produces a ground pulse at output terminal 3.

Figure 11:
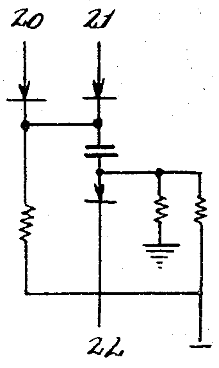
FIGURE 11 is a schematic circuit diagram of a shaping circuit utilized in the invention.

FIGURE 11 represents the coupling circuit 144 connected between gated amplifier 143 and terminal 6 of flip-flop circuit 122, in the echo-elimination circuit 140. This circuit is primarily a resistance-capacitance network for shaping and applying the proper bias to the output signal applied to terminal 6 of gated amplifier 143. The signal is applied to terminal 20 of circuit 144 and the output taken from terminal 22 thereof.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a digital data handling system utilizing information bits of one of two characters, transmitting apparatus of the character described, comprising: a source of data in digital form of $m$-bit groups, with a digit rate, $f_m$; means connected to said source for translating the data into $n$-bit groups with each bit of one character preceded and followed by a bit of the other character, $m$ and $n$ being positive integers, and $n$ being greater than $m$; a source of carrier; means for modulating said carrier with said $n$-bit data group, utilizing phase reversal modulation, phase reversals being effected on occurrence of bits of said one character; and means for transmitting said modulated carrier, said transmitting means including a transmission channel having a bandwidth less than said $m$-bit digit rate, $f_m$.

2. In a digital data handling system utilizing information bits of one of two characters, transmitting apparatus of the character described, comprising: a source of data in digital form of $m$-bit groups, with a digit rate, $f_m$; means connected to said source for translating the data into $n$-bit groups with each bit of one character preceded and followed by a bit of the other character, $m$ and $n$ being positive integers, and $n$ being greater than $m$; a source of carrier having a frequency, $f_c$, less than said data rate, $m_m$; means for modulating said carrier with said $n$-bit data groups utilizing phase reversal modulation, phase reversals being effected on occurrence of bits of said one character; and means for transmitting said modulated carrier, said transmitting means including a transmission channel having a bandwidth less than said $m$-bit digit rate, $f_m$.

3. In a digital data handling system, transmitting apparatus of the character described, comprising: a source of data in digital form of $m$-bit groups, with a digit rate, $f_m$; means connected to said source for translating the data into digital binary $n$-bit groups with each one-bit preceded and succeeded by a zero-bit, $m$ and $n$ being positive integers and $n$ being greater than $m$; a source of carrier having a frequency, $f_c$, less than said digit rate, $f_m$; means for modulating said carrier with said $n$-bit data groups utilizing phase reversal modulation, phase reversals being effected on occurrence of bits of said one character; and means for transmitting said data in $n$-bit form, said transmitting means including a transmission channel having a bandwidth less than said $m$-bit digit rate, $f_m$.

4. The data transmitting apparatus of claim 3 wherein said carrier frequency is equal to one-half the $n$-bit data rate $f_n$.

5. In a digital data handling system utilizing information bits of one of two characters, transmitting apparatus of the character described, comprising: a source of data in digital form of $m$-bit groups, with a digit rate, $f_m$; means connected to said source of translating of data into $n$-bit groups with each bit of one character preceded and followed by a bit of the other character, $m$ and $n$ being positive integers, the $n$-bit groups having a data rate, $f_n$, $f_n$ being greater than $f_m$; a source of carrier, having a frequency, $f_c$, where $$f_c=\frac{f_n}{2}$$

means for modulating said carrier with said $n$-bit data groups, utilizing phase reversal modulation, phase reversals being effected on occurrence of bits of said one character; and means for transmitting modulated carrier, said transmitting means including a transmission channel having a bandwith less than said $m$-bit digit rate, $f_m$.

6. The data transmitting apparatus of claim 5 wherein said modulating means effects phase reversal of the carrier substantially at zero carrier amplitude.

7. In a digital data handling system utilizing information bits of one of two characters, transmitting apparatus of the character described, comprising: a source of data in digital form of $m$-bit groups, with a digit rate, $f_m$; means connected to said source for translating the data into $n$-bit groups with each bit of one character preceded and followed by a bit of the other character, $m$ and $n$ being positive integers, and $n$ being greater than $m$; a source of carrier having a frequency $f_c$; means for modulating said carrier with said $n$-bit data groups utilizing phase reversal modulation, phase reversals being effected on occurrence of bits of said one character; and means for transmitting said modulated carrier, said transmitting means including a transmission channel having a bandwidth, said carrier frequency $f_c$ being no greater than said bandwidth.

8. In a digital data handling system, transmitting apparatus of the character described, comprising: a source of data in digital form of $m$-bit groups; means connected to said source for translating the data into digital binary $n$-bit groups with each one-bit preceded and succeeded by a zero-bit, $m$ and $n$ being positive integers, and $n$ being greater than $m$: a source of carrier; a modulating means for modulating said carrier with the $n$-bit data groups, and effecting a phase reversal of the carrier with each one-bit digit; and means for transmitting said data modulated carrier.

9. In a digital data handling system, transmitting apparatus of the character described, comprising: a source of data in digital form of $m$-bit groups; means connected to said source for translating the data into $n$-bit groups with each one-bit preceded and succeeded by a zero-bit; $m$ and $n$ being positive integers and said $n$-bit groups having a digit rate, $f_n$, $n$ being greater than $m$; a source of carrier having a frequency, $f_c$, where $$f_c=\frac{f_n}{2}$$

modulating means for modulating said carrier with the $n$-bit data effecting a phase reversal of the carrier with each one-bit digit; and means for transmitting said data modulated carrier.

10. The data transmitting apparatus of claim 9 wherein carrier phase reversal is effected in said modulator of the occurrence of one-bits in said $n$-bit data groups and in substantial synchronism with the occurrence with zero carrier amplitude.

11. In a digital data handling system, transmitting apparatus of the character described, comprising: a source of data in digital form of $m$-bit groups, at a digital rate $f_m$; means connected to said source for translating the data into $n$-bit groups with digital rate $f_n$, where $$\frac{f_m}{m}=\frac{f_n}{n}$$

$m$ and $n$ being positive integers with $n$ greater than $m$ and with each one-bit preceded and succeeded by a zero-bit; a source of carrier having a frequency, $f_c$, where $$f_c=\frac{f_n}{2}$$

means for modulating said carrier with $n$-bit data, effecting a phase reversal of the carrier with each one-bit digit; and means for transmitting the data modulated carrier, the transmitting means including a transmission channel having a bandwidth with an upper limit of the order of said carrier frequency.

12. In a digital data handling system utilizing information bits of one of two characters, transmitting apparatus of the character described, comprising: a source of data in binary digital form at a digit rate, $f_n$, said data having each digit of one character preceded and followed by a digit of the other character; a source of carrier having a frequency $f_c$, where $$f_c=\frac{f_n}{2}$$

and a modulator for phase reversal modulating said carrier with said digital data, phase reversals being effected on occurrence of digits of said one character.

13. In a digital data handling system utilizing information bits of one of two characters, transmitting apparatus of the character described, comprising: a source of data in binary digital form at a digit rate, $f_n$, said data having each digit of one character preceded and followed by a digit of the other character, a source of carrier having a frequency $f_c$, where $$f_c=\frac{f_n}{2}$$

a modulator for phase reversal modulating said carrier with said digital data, phase reversals being effected on occurrence of digits of said one character; and means for transmitting said modulated carrier, said transmitting means including a transmission channel having a bandwidth with an upper limit of the order of said carrier frequency, and substantially less than said digit rate.

14. In a digital data handling system, transmitting apparatus of the character described, comprising: a source of data in digital form of $m$-bit groups; means connected to said source for translating the data into $n$-bit groups with predetermined limitations on the sequence of digits in each $n$-bit group, $m$ and $n$ being positive integers; a source of synchronizing signal; means responsive to a synchronizing signal from said source to produce an $n$-bit synchronizing group having a predetermined sequence of digits which is excluded from the sequence of digits produced by said translating means; means for adding the $n$-bit synchronizing group to the $n$-bit data groups; and means for transmitting all of said $n$-bit groups.

15. In a digital data handling system, transmitting apparatus of the character described, comprising: a source of data in digital form of $m$-bit groups; means connected to said source for translating the data into $n$-bit groups with each one-bit preceded and succeeded by a zero-bit; $m$ and $n$ being positive integers; a source of synchronizing signal; means responsive to said synchronizing signal for producing an $n$-bit synchronizing group comprising the sequence of one-bit and $n-1$ zero bits; means for adding the $n$-bit synchronizing group to the $n$-bit data groups; and means for transmitting all of said $n$-bit groups.

16. In a digital data handling system, transmitting apparatus of the character described, comprising: a source of data in digital form of $m$-bit groups; means connected to said source for translating the data into $n$-bit groups with each one-bit being preceded and succeeded by a zero-bit, said $n$-bit groups having a maximum of $n-3$ sequential zero bits, $m$ and $n$ being positive integers; a source of synchronizing signal; means responsive to said synchronizing signal for producing an $n$-bit synchronizing group comprising the sequence of one-bit and $n-1$ zero-bits; means for adding the $n$-bit synchronizing group to the $n$-bit data groups; and means for transmitting all of said $n$-bit groups.

17. In a digital data handling system, transmitting apparatus of the character described, comprising: a source of data in digital form of $m$-bit groups; means connected to said source for translating the data into $n$-bit groups with each one-bit being preceded and succeeded by a zero-bit, said $n$-bit groups having a maximum of $n-3$ sequential zero bits, and a terminal bit of each $n$-bit group being a zero, $m$ and $n$ being positive integers; a source of synchronizing signal; means responsive to said synchronizing signal for producing an $n$-bit synchronizing group comprising the sequence of one-bit and $n-1$ zero bits; means for adding the $n$-bit synchronizing group to the $n$-bit data groups; and means for transmitting all of said $n$-bit groups.

18. In a digital data handling system, transmitting apparatus of the character described, comprising: a source of data in digital form of $m$-bit groups; means connected to said source for translating the data in $n$-bit groups with predetermined limitations on the sequence of digits in each $n$-bit group, $m$ and $n$ being positive integers; means for controlling the transfer of data groups through said translating means; a source of synchronizing signal; means for generating an $n$-bit synchronizing group; means responsive to said synchronizing signal for blocking the transfer of data through said translating means during the generation of said synchronizing group; and means for transmitting the $n$-bit groups.

19. In a digital data handling system, transmitting apparatus of the character described, comprising: a source of data in digital form of $m$-bit groups; means connected to said source for translating the data in $n$-bit groups with predetermined limitations on the sequence of digits in each $n$-bit group, $m$ and $n$ being positive integers; means for controlling the transfer of data groups through said translating means; a source of word synchronizing signal; means for generating an $n$-bit word synchronizing group; means responsive to said synchronizing signal for blocking the transfer of data through said translating means during the generation of said synchronizing group; a source of auxiliary control signal; means responsive to an auxiliary control signal for generating an $n$-bit control group in response thereto; means responsive to a control signal for blocking transfer of data through said translating means during the generation of a control signal group; and means for transmitting the $n$-bit groups.

20. In a digital data handling system, transmitting apparatus of the character described, comprising: a source of data in digital form of $m$-bit groups; means connected to said source for translating the data into $n$-bit groups with predetermined limitations on the sequence of digits in each $n$-bit group, $m$ and $n$ being positive integers; a source of synchronizing signal; means responsive to said synchronizing signal for producing an $n$-bit synchronizing group comprising the sequence of a one-bit and $n-1$ zero-bits, said $n$-bit synchronizing group generating means including an $n$-stage cascade-connected flip-flop circuit.

21. In a digital data handling system, transmitting apparatus of the character described, comprising: a source of data in digital form of $m$-bit groups; means connected to said source for translating the data into $n$-bit groups with each one-bit preceded and succeeded by a zero-bit, $m$ and $n$ being positive integers; a transfer register connected with the output of said translating means and comprising an $n$-stage cascade-connected flip-flop circuit; a source of synchronizing signal; means responsive to said synchronizing signal for producing an $n$-bit synchronizing group comprising the sequence of a one-bit and $n-1$ zero-bits, said generating means including means for applying a synchronizing control signal to the first stage of said transfer register; and means for transmitting all of said $n$-bit groups.

22. In a digital binary data handling system utilizing information bits of one of two characters, receiving apparatus of the character described, comprising: a source of phase shift modulated carrier signal with modulation having each bit of one character preceded and followed by a bit of the other character; phase shift means connected with said modulated carrier source for delaying the received signal, shifting it with respect to the undelayed signal by the amount corresponding to the modulation phase shift of the signal; and a comparison detector for comparing the undelayed with the delayed signal and having an output responsive to the difference between the delayed and undelayed signals for indicating the occurrence of a data bit of said one characteristic.

23. In a digital binary data handling system utilizing information bits of one of two characters, receiving apparatus of the character described, comprising: a source of phase shift modulated carrier signal with modulation having each bit of one character preceded and followed by a bit of the other character; phase shift means connected with said modulated carrier source for delaying the received signal, shifting it with respect to the undelayed signal by the amount corresponding to the modulation phase shift of the signal; a comparison detector for comparing the undelayed with the delayed signal and having an output responsive to the difference between the delayed and undelayed signals for indicating the occurrence of a data bit of said one characteristic; and means for eliminating from the output of said detector one of each two successive information bits of said one character.

24. In a digital binary data handling system utilizing information bits of one of two characters receiving apparatus of the character described, comprising: a source of phase shift modulated carrier signal with modulation having each bit of one character preceded and followed by a bit of the other character; a detector connected with said source and having an output comprising signals representing the occurrence of data bits of said one character; and means for eliminating from the output of said detector one of each two successive information bits of said one character.

25. In a digital binary data handling system, receiving apparatus of the character described, comprising: a source of phase shift modulated carrier signal with modulation having each one-bit preceded and followed by a zero-bit; phase shift means connected with said modulated carrier source for delaying the received signal, shifting it with respect to the undelayed signal by the amount corresponding to the modulation phase shift of the signal; a comparison detector for comparing the undelayed with the delayed signal and having an output responsive to the difference between the delayed and undelayed signals for indicating the occurrence of a one-bit, said detector having a pulse output; a first flip-flop circuit connected with said detector and in the signal channel of said receiver; and a second flip-flop circuit responsive to the pulse output of said detector and having an output connected to said first flip-flop circuit blocking response by the flip-flop circuit to successive one-bits of information from said detector.

26. In a digital binary data handling system, receiving apparatus of the character described, comprising: a source of phase shift modulated carrier signal with modulation having each one-bit preceded and followed by a zero-bit; phase shift means connected with said modulated carrier source for delaying the received signal, shifting it with respect to the undelayed signal by the amount corresponding to the modulation phase shift of the signal; a comparison detector for comparing the undelayed with the delayed signal and having an output responsive to the difference between the delayed and undelayed signals for indicating the occurrence of a one-bit, said detector having a pulse output; a first flip-flop circuit connected with said detector and in the signal channel of said receiver; a second flip-flop circuit responsive to the pulse output of said detector and having an output connected to said first flip-flop circuit blocking response by the flip-flop circuit to successive one-bits of information from said detector; and means to reset said first flip-flop circuit.

27. In a digital binary data handling system, receiving apparatus of the character described, comprising: a source of combined data and word synchronizing signals in *n*-bit digital groups; means connected to said source for translating the data into *m*-bit groups, *m* and *n* being positive integers; means for sensing the occurrence of *n*-bit word synchronizing group and for generating a synchronizing signal in response thereto; and means for delaying said word synchronizing signal for an amount corresponding with the time required to translate said data groups.

28. In a digital binary data handling system, receiving apparatus of the character described, comprising: a source of combined data and word synchronizing signals in *n*-bit digital groups; means connected to said source for translating the data into *m*-bit groups, *m* and *n* being positive integers; means for sensing the occurrence of an *n*-bit word synchronizing group and for generating a synchronizing signal in response thereto; a translating matrix for converting said *n*-bit data groups into *m*-bit data groups; an *n*-stage transfer register connected between said source and said matrix; an *m*-bit transfer register connected with the output of said matrix; means for sensing the occurrence of an *n*-bit word synchronizing group in the output of said *n*-stage transfer register and for generating a synchronizing signal in response thereto; and means for delaying said synchroning signal by an amount corresponding with the time required to pass a data group through said matrix and *m*-bit transfer register.

References Cited by the Examiner

UNITED STATES PATENTS

| | | | |
|---|---|---|---|
| 2,959,351 | 11/60 | Hamilton | 340—172.5 |
| 3,032,745 | 5/62 | Hamer | 178—68 X |

OTHER REFERENCES

Publication: IBM Data Processing, 650 Data Processing System; Customer Engineering Manual of Instruction, Copyright 1956 and 1957.

Hagelbarger, D. W.: Bell System Technical Journal, vol. 38, pages 976–9, New York, 1959.

DAVID G. REDINBAUGH, *Primary Examiner.*

STEPHEN W. CAPELLI, *Examiner.*